United States Patent
Wang et al.

(10) Patent No.: US 12,085,949 B2
(45) Date of Patent: Sep. 10, 2024

(54) AUTONOMOUS MOBILE ROBOT, METHOD FOR DOCKING AUTONOMOUS MOBILE ROBOT, CONTROL DEVICE AND SMART CLEANING SYSTEM

(71) Applicant: SHENZHEN ROCK TIMES TECHNOLOGY CO., LTD., Shenzhen (CN)

(72) Inventors: Lei Wang, Shenzhen (CN); Haojian Xie, Shenzhen (CN)

(73) Assignee: SHENZHEN ROCK TIMES TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/737,904

(22) Filed: May 5, 2022

(65) Prior Publication Data
US 2022/0276658 A1 Sep. 1, 2022

Related U.S. Application Data

(63) Continuation of application No. 16/883,706, filed on May 26, 2020, now Pat. No. 11,347,230, which is a
(Continued)

(30) Foreign Application Priority Data

Sep. 25, 2017 (CN) .......................... 201710876877.0

(51) Int. Cl.
*G05D 1/00* (2024.01)
*B25J 9/00* (2006.01)
*B25J 11/00* (2006.01)

(52) U.S. Cl.
CPC .......... *G05D 1/0225* (2013.01); *B25J 9/0003* (2013.01); *B25J 11/0085* (2013.01); *G05D 1/0219* (2013.01); *G05D 1/0238* (2013.01)

(58) Field of Classification Search
CPC .. G05D 1/0225; G05D 1/0219; G05D 1/0238; G05D 1/028; G05D 2201/0203;
(Continued)

(56) References Cited

U.S. PATENT DOCUMENTS 6,205,380 B1 3/2001 Bauer et al.
6,925,679 B2 * 8/2005 Wallach .................... A47L 5/36
15/340.1
(Continued)

FOREIGN PATENT DOCUMENTS

CN 101738195 A 6/2010
CN 102608618 A 7/2012
(Continued)

OTHER PUBLICATIONS

Chinese Office Action, mailed on Mar. 22, 2021, for Chinese Application No. 201710876877.0, 18 pages. (with English translation).
(Continued)

*Primary Examiner* — Jason Holloway
*Assistant Examiner* — Blake A Wood
(74) *Attorney, Agent, or Firm* — Calfee, Halter & Griswold LLP

(57) ABSTRACT

In some examples, a robot includes: a machine body; a driving system, configured to drive the machine body and elements disposed in the machine body to move across a surface; a signal receiver, configured to receive a signal from a charging station; a control system, disposed in the machine body, and configured to build a simultaneous map of an environment in which the robot locates, and navigate the robot based on the simultaneous map; wherein, in a process of docking the robot, the signal receiver determines whether the robot is in a coverage region of the signal from the charging station; in response to determining that the robot is
(Continued)

not in the coverage region of the signal from the charging station, the control system controls the driving system to drive the robot to move toward an open region based on the simultaneous map.

16 Claims, 9 Drawing Sheets

Related U.S. Application Data continuation of application No. PCT/CN2018/105836, filed on Sep. 14, 2018.

(58) Field of Classification Search
CPC ...... B25J 9/0003; B25J 11/0085; B60L 53/37; B60L 2260/32; A74L 2201/0022; A74L 2201/04; A74L 11/4005; A74L 11/4011; A74L 11/24; A74L 11/40; A74L 11/4061; A74L 2201/00; A74L 2201/02; G01C 3/02; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 9,354,634 B2 | 5/2016 | Ko | |
| 2006/0076039 A1 | 4/2006 | Song et al. | |
| 2006/0273749 A1* | 12/2006 | Im | G05D 1/0242 318/587 |
| 2007/0244610 A1 | 10/2007 | Ozick et al. | |
| 2008/0012518 A1 | 1/2008 | Yamamoto | |
| 2008/0184518 A1 | 8/2008 | Taylor et al. | |
| 2008/0249661 A1 | 10/2008 | Hong et al. | |
| 2010/0324731 A1 | 12/2010 | Letsky | |
| 2010/0324736 A1 | 12/2010 | Yoo et al. | |
| 2011/0137461 A1* | 6/2011 | Kong | G05D 1/0274 901/1 |
| 2011/0167574 A1 | 7/2011 | Stout et al. | |
| 2011/0202175 A1* | 8/2011 | Romanov | A47L 11/4036 700/250 |
| 2012/0116588 A1* | 5/2012 | Lee | G05D 1/0255 901/47 |
| 2012/0125363 A1* | 5/2012 | Kim | A47L 9/2847 134/6 |
| 2012/0265391 A1 | 10/2012 | Letsky | |
| 2013/0098401 A1* | 4/2013 | Yoon | A47L 11/4066 15/21.1 |
| 2013/0116880 A1 | 5/2013 | Shitamoto et al. | |
| 2013/0214727 A1 | 8/2013 | Teng et al. | |
| 2016/0070268 A1 | 3/2016 | Ko | |
| 2016/0271795 A1* | 9/2016 | Vicenti | G05D 1/0272 |
| 2017/0001311 A1 | 1/2017 | Bushman et al. | |
| 2017/0050311 A1 | 2/2017 | Yoo et al. | |
| 2017/0072564 A1 | 3/2017 | Cohen et al. | |
| 2017/0177001 A1* | 6/2017 | Cao | B60L 53/36 |
| 2017/0205822 A1* | 7/2017 | Shin | A47L 11/4061 |
| 2017/0296010 A1* | 10/2017 | Li | A47L 9/149 |
| 2018/0039275 A1* | 2/2018 | Yun | A47L 9/2884 |
| 2018/0052468 A1* | 2/2018 | Choe | B60L 53/36 |
| 2018/0074508 A1* | 3/2018 | Kleiner | A47L 9/2857 |
| 2018/0137675 A1 | 5/2018 | Kwant et al. | |
| 2018/0246518 A1* | 8/2018 | Vogel | G05D 1/0234 |
| 2018/0249872 A1* | 9/2018 | Park | A47L 11/4061 |
| 2018/0370376 A1 | 12/2018 | Liu et al. | |
| 2019/0018424 A1* | 1/2019 | Hillen | G01C 21/206 |
| 2019/0163174 A1* | 5/2019 | Ko | G05D 1/028 |
| 2019/0163175 A1* | 5/2019 | Ko | G05D 1/0088 |
| 2020/0064838 A1 | 2/2020 | Izawa et al. | |
| 2020/0077860 A1 | 3/2020 | Lamon et al. | |
| 2020/0293055 A1* | 9/2020 | Wang | G05D 1/0219 |

FOREIGN PATENT DOCUMENTS

| | | |
|---|---|---|
| CN | 103948354 A | 7/2014 |
| CN | 103995984 A | 8/2014 |
| CN | 104040450 A | 9/2014 |
| CN | 104055462 A | 9/2014 |
| CN | 104765379 A | 7/2015 |
| CN | 105119338 A | 12/2015 |
| CN | 105259918 A | 1/2016 |
| CN | 105629971 A | 6/2016 |
| CN | 105652876 A | 6/2016 |
| CN | 105929843 A | 9/2016 |
| CN | 106200645 A | 12/2016 |
| CN | 106308685 A | 1/2017 |
| CN | 106455888 A | 2/2017 |
| CN | 205970884 U | 2/2017 |
| CN | 106774295 A | 5/2017 |
| CN | 107041718 A | 8/2017 |
| JP | H03327 A | 1/1991 |
| JP | 2008181177 A | 8/2008 |
| JP | 2009112723 A | 5/2009 |
| JP | 2014-232509 A | 12/2014 |
| JP | 6104715 B2 | 3/2017 |
| KR | 100782863 B1 | 12/2007 |
| TW | M541825 U | 5/2017 |
| WO | 2013182941 A1 | 12/2013 |
| WO | 2017071372 A1 | 5/2017 |

OTHER PUBLICATIONS

English translation of Office Action for CN Application No. 201710876877.0, dated Oct. 26, 2020.
European Office Action, dated Nov. 16, 2021, for European Application No. 18 857 524.5, 5 pages.
Extended European Search Report, dated Mar. 16, 2021 for European Application No. 18 85 8506, 10 pages.
English translation of Office Action for TW Application No. 107131822, dated Aug. 7, 2019.
English translation of Office Action of CN Office Action 201710875075.8 dated Dec. 3, 2020.
International Search Report for PCT Application No. PCT/CN2018/106968, dated Jan. 23, 2019.
Office Action for U.S. Appl. No. 16/760,881, dated Jan. 1, 2021.
English translation of International Search Report and Written Opinion received in PCT/CN2018/105836 dated Dec. 21, 2018.
Chen et al., "An Ant Colony Algorithm for Robot Path Planning in a Honeycomb Grid," Mechanical Science and Technology for Aerospace Engineering 35(8), Aug. 2016, URL=https://max.book118.com/html/2019/0309/6235055001002014.shtm, download date Jul. 12, 2013. (6 pages).
Office Action, dated Nov. 18, 2022, for Chinese Patent Application No. 202210116495.9. (15 pages) (with English Translation).

* cited by examiner

AUTONOMOUS MOBILE ROBOT, METHOD FOR DOCKING AUTONOMOUS MOBILE ROBOT, CONTROL DEVICE AND SMART CLEANING SYSTEM

CROSS-REFERENCE TO RELATED APPLICATION

This application is a continuation application of U.S. application Ser. No. 16/883,706, which is a continuation application of PCT Application No. PCT/CN2018/105836, filed Sep. 14, 2018, which claims priority of Chinese Patent Application No. CN 201710876877.0, filed Sep. 25, 2017, the entire contents of all of which are incorporated herein by reference.

TECHNICAL FIELD

The present disclosure relates to the field of robot technologies, and more specifically, to an autonomous mobile robot, a method for docking an autonomous mobile robot, a control device, an autonomous mobile robot and a smart cleaning system.

BACKGROUND

Autonomous mobile robots are becoming more popular today. Autonomous mobile robots are usually equipped with charging stations. When an autonomous mobile robot is in a low energy level, it can be charged at a charging station. In the conventional docking method, the charging station transmits a signal and the autonomous mobile robot receives the signal; and when the autonomous mobile robot needs to be charged, a control system controls a driving system based on a homing signal sent by the charging station, so that the autonomous mobile robot moves towards the charging station for charging.

However, in practice, the following case may occur: A starting position of the autonomous mobile robot is far from the charging station, or there is an isolation zone between the starting position and the charging station. In this case, the autonomous mobile robot cannot detect signals from the charging station. At this time, if the autonomous mobile robot needs to be charged, there is a high probability that the autonomous mobile robot can not find the charging station. In this case, the autonomous mobile device needs to be placed on or near the charging station manually for charging. Consequently, the poor operation lowers the user experience.

SUMMARY

A series of simplified concepts are introduced in the SUMMARY section. These concepts are further described in detail in the DESCRIPTION OF EMBODIMENTS section. The SUMMARY section of the present disclosure does not imply an attempt to define the key features and essential technical features of the claimed technical solutions, nor does it imply an attempt to determine the protection scope of the claimed technical solutions.

To resolve at least some of the foregoing technical problems, an aspect of the embodiments of the present disclosure provides a robot. The robot includes:
a machine body;
a driving system, configured to drive the machine body and elements disposed in the machine body to move across a surface;
a signal receiver, configured to receive a signal from a charging station;
a control system, disposed in the machine body, and configured to build a simultaneous map of an environment in which the robot is located, and navigate the robot based on the simultaneous map;
wherein, in a process of docking the robot, the signal receiver determines whether the robot is in a coverage region of the signal from the charging station; in response to determining that the robot is not in the coverage region of the signal from the charging station, the control system controls the driving system to drive the robot to move toward a non-clutter region based on the simultaneous map.

The present disclosure further provides a method for docking a robot with a charging station. The method includes:
building, by a control system of the robot, a simultaneous map of an environment in which the robot is located, and navigating the robot based on the simultaneous map;
determining, by the control system, whether the robot is in a coverage region of a signal from the charging station;
controlling, by the control system, the robot to move toward a non-clutter region based on the simultaneous map, in response to determining that the robot is not in the coverage region of the signal from the charging station.

The present disclosure further provides a device for controlling a robot. The device includes: a memory, a processor, and a computer program stored in the memory and that runs on the processor, wherein the processor, when executing the program, is configured to perform operations including:
building a simultaneous map of an environment in which the robot is located, and navigating the robot based on the simultaneous map;
determining whether the robot is in a coverage region of a signal from a charging station;
controlling the robot to move toward an open region based on the simultaneous map, in response to determining that the robot is not in the coverage region of the signal from the charging station.

BRIEF DESCRIPTION OF DRAWINGS

The following describes embodiments of the present disclosure in detail with reference to accompanying drawings, so as to make the foregoing and other purposes, features, and advantages of the present disclosure clearer. The accompanying drawings are intended to provide a further explanation of the embodiments of the present disclosure and constitute a part of the present specification. The accompanying drawings and the embodiments of the present disclosure are jointly used to explain the present disclosure, but do not constitute a limitation on the present disclosure. Same reference numerals in the accompanying drawings usually represent same or similar parts or steps.

DESCRIPTION OF EMBODIMENTS

To make the purposes, technical solutions, and advantages of the present disclosure clearer, the following describes example embodiments of the present disclosure in detail with reference to the accompanying drawings. Clearly, the described embodiments are merely some but not all of the embodiments of the present disclosure. It should be understood that the present disclosure is not limited by the example embodiments described herein. All other embodiments obtained by a person skilled in the art based on the embodiments of the present disclosure without creative efforts shall fall within the protection scope of the present disclosure.

Figure 1:
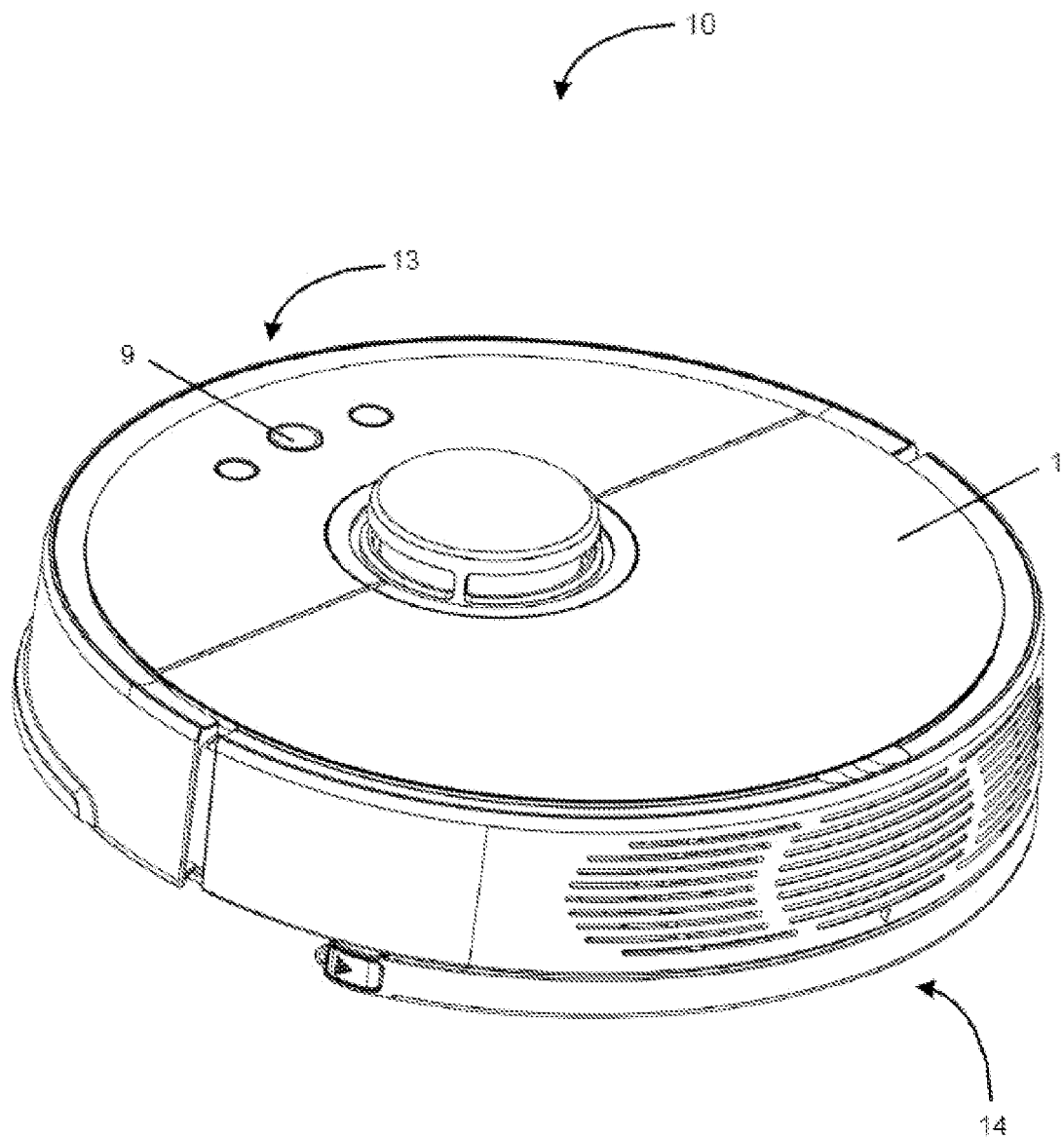
FIG. 1 is a schematic top view of an autonomous mobile robot according to some embodiments of the present disclosure.
Figure 2:
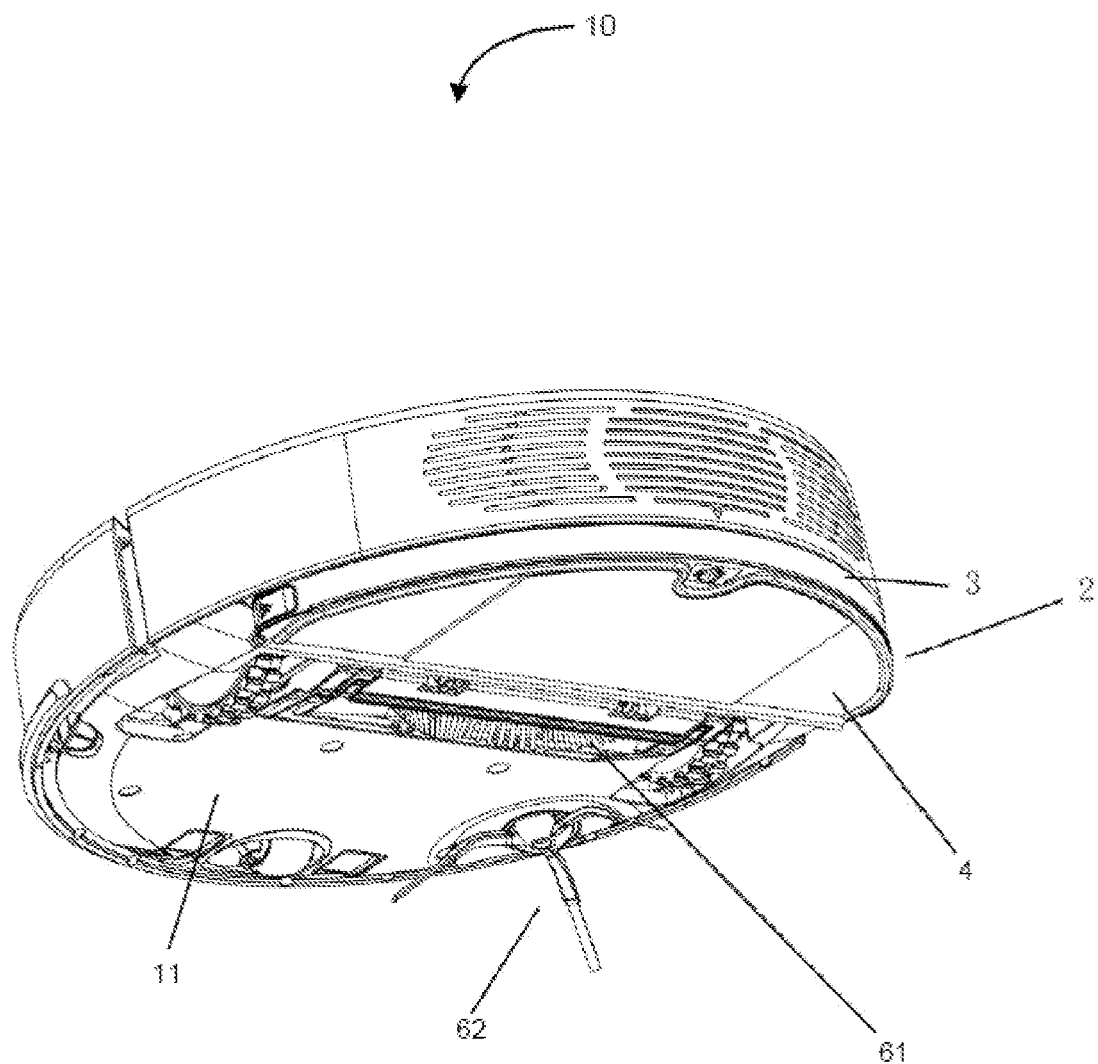
FIG. 2 is a schematic bottom view of an autonomous mobile robot according to some embodiments of the present disclosure.

FIG. 1 and FIG. 2 are schematic structural diagrams of an autonomous mobile robot according to an example embodiment. The structure of the autonomous mobile robot is described in detail below.

In the illustrated embodiment, the autonomous mobile robot may be a cleaning robot 10. In addition to a machine body 1 and a cleaning system, the cleaning robot 10 includes a sensing system, a control system, a driving system, an power system, and a human-machine interaction system 9. The main parts of the cleaning robot are described in detail below.

The machine body 1 includes an upper cover, a front part 13, a rear part 14, a chassis 11, and the like. The machine body 1 may be in an approximate circle (both the front and the rear are circular) or may be in other shapes, including but not limited to the approximate D-shape, that is, the front part is a partial rectangle and the rear part is a partial circle.

The sensing system may include several sensing apparatuses, such as a position determining apparatus disposed above the machine body 1, a bumper disposed on the front part 13 of the machine body 1, an ultrasonic sensor, an infrared sensor, a magnetometer, an accelerometer, a gyroscope, and an odometer. These sensing apparatuses provide various position information and motion state information of the machine for the control system. The position determining apparatus includes but is not limited to an infrared emitting and receiving apparatus, a camera, and a laser distance sensor (LDS).

The cleaning system may include a dry cleaning unit and a wet cleaning unit. The wet cleaning unit is a first cleaning unit 2, and it is able to wipe a surface (such as a floor) by using a cleaning cloth 4 that is wetted by cleaning liquid.

The dry cleaning unit is a second cleaning unit, and it able to remove debris from a surface by using a cleaning head, such as a cleaning brush.

The second cleaning unit may include a rolling brush 61, a dust container, a fan, a ventilation outlet, and connecting parts among the above four parts. The rolling brush 61 in contact with the surface sweeps debris on the surface and brings it to the front of a dust suction port between the rolling brush 61 and the dust container, and then the debris is conveyed into the dust container by an air suction stream generated by the fan and passing through the dust container. The dedusting capability of a cleaning machine can be represented by dust pick up efficiency (DPU). The DPU is affected by the structure and material of the rolling brush 61, wind power utilization of an air duct made up of the dust suction port, the dust container, the fan, the ventilation outlet, and the connecting parts among the four parts, and by a type and power of the fan. Compared with the conventional cleaner, a high dedusting capability is more important for autonomous cleaning robots. The energy requirement by the cleaning robot may be reduced by a high dedusting capability. For example a robot that can clean 80 square meters of the surface with a single charge can be improved to clean 100 or more square meters of the surface. In addition, as the number of charging times decreases, a service life of a battery may increase. Consequently, the frequency of replacing the battery decreases. The dedusting capability is an important user experience, for a user can sense whether a surface is clean after operation by a cleaning robot. The dry cleaning system may further include a side brush 62 having a rotation shaft. The rotation shaft is disposed at an angle relative to the floor, so as to move debris into a cleaning region of the rolling brush 61 of the second cleaning unit.

The first cleaning unit 2 may include a liquid tank 3, a cleaning cloth 4, and the like. The liquid tank 3 may serve as a base for carrying other parts of the first cleaning unit 2. The cleaning cloth 4 is detachably disposed on the liquid tank 3. The liquid inside the liquid tank 3 flows to the cleaning cloth 4 to facilitate the cleaning cloth 4 wiping a surface.

The driving system is configured to drive the cleaning robot to implement automatic moving and cleaning. The driving system includes a driving wheel module. The driving system may send a driving command to control the robot to move across the surface, based on distance and angle information such as components x, y, and θ. The driving wheel module may control a left wheel and a right wheel simultaneously. To control the movement of the machine more accurately, the driving wheel module preferably includes a left driving wheel module and a right driving wheel module. The left and right driving wheel modules are symmetrically disposed along a lateral axis that is defined by the machine body 1. To improve the motion stability and motion ability of the cleaning robot, the robot may include one or more driven wheels, and the driven wheels include but are not limited to casters.

The driving wheel module includes a wheel, a driving motor, and a control circuit for controlling the driving motor. The driving wheel module may connect to an odometer and a circuit for measuring a drive current. The driving wheel module may be detachably connected to the machine body 1 to facilitate assembly, disassembly, and maintenance. The driving wheel may have a biased-to-drop suspension system that is secured in a movable manner. For example, the suspension system is rotately attached to the machine body 1, and receives a spring bias that is offset downward and away from the machine body 1. The spring bias allows the driving wheel to maintain contact and traction with the floor by using a specific touchdown force, and the cleaning element (such as the rolling brush) of the robot also contacts the floor with a specific pressure.

The front part 13 of the machine body 1 may carry a bumper. When the driving wheel module drives the robot to traverse on the floor during cleaning, the bumper detects one or more events in the traveling route of the robot by using a sensor system, such as an infrared sensor. Based on the events detected by the bumper, such as obstacles and walls, the robot can control the driving wheel module to enable the robot to respond to the events, for example, keep away from the obstacles.

Figure 11:
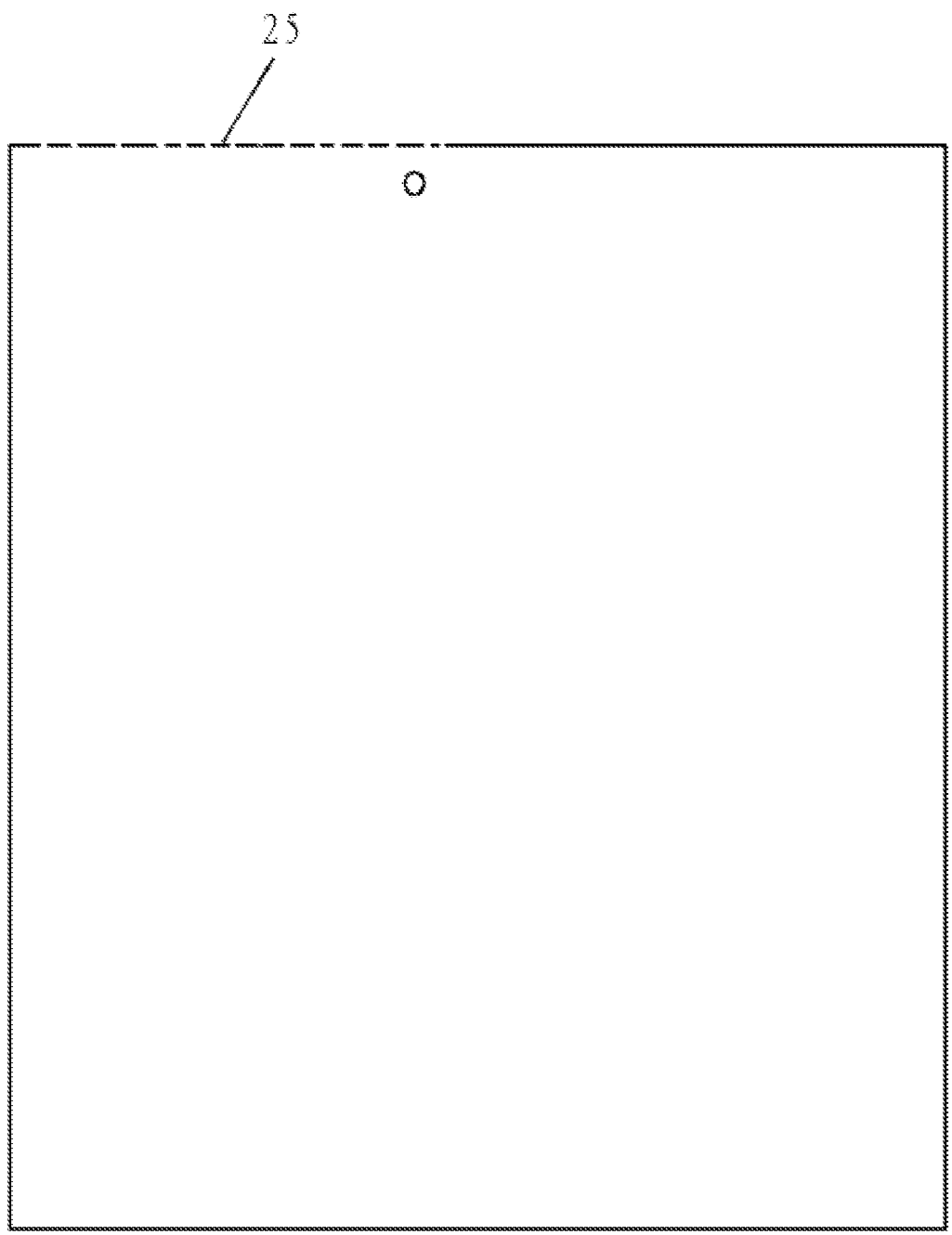
FIG. 11 schematically shows a boundary of a confined area for an autonomous mobile robot according to some embodiments of the present disclosure.

In general, to prevent the robot from entering a confined region (for example, a region where fragile items are placed and a region having water on the floor, such as a bathroom) in the house, the cleaning robot further includes a confined region detector. The confined region detector includes a virtual wall sensor. The virtual wall sensor defines a confined region by setting a virtual wall based on the user's desire. As shown in FIG. 11, when detecting the virtual wall, the virtual wall sensor may control the driving wheel module to prohibit the cleaning robot from entering the confined region by crossing a boundary 25 (i.e., the virtual wall) of the confined region.

In addition, to prevent the robot from falling at, for example, an indoor staircase and a higher step, the confined region detector may further include a cliff sensor. The cliff sensor defines a confined region by setting a boundary based on the user's desire. As shown in FIG. 11, when detecting the boundary (i.e., a cliff) of the confined region, the cliff sensor may control the driving wheel module to prohibit the cleaning robot from crossing the boundary 25 of the configured region, thereby preventing the robot from falling off the cliff.

The control system is provided on the main circuit board in the machine body 1. The control system may include a non-transitory memory, a computing processor, etc. The non-transitory memory may include a hard disk, a flash memory, or a random access memory. The computing processor may include one or more central processing unit. The computing processor may also include an application processor. In some examples, the application processor generates, based on obstacle information fed back by a laser distance sensor and by using a positioning algorithm such as SLAM, an instant map of an environment in which the robot is located. Combining with distance information and velocity information sent by sensing apparatuses such as the bumper, the cliff sensor, the ultrasonic sensor, the infrared sensor, the magnetometer, the accelerometer, the gyroscope, and the odometer, a current working status of the cleaning robot is determined. For example, the control system may determine whether the cleaning robot crosses a threshold, moves a carpet, reaches a cliff, is stuck, or is picked up. In addition, the control system may determine whether the dust container is full. The control system may provide different next action strategies based on different situations, to make the robot meet the user's requirements and deliver better user experience. Furthermore, the control system may plan an efficient and reasonable cleaning route and cleaning manner based on information about the instant map that is drawn based on SLAM, thereby improving the cleaning efficiency of the robot.

Figure 6:
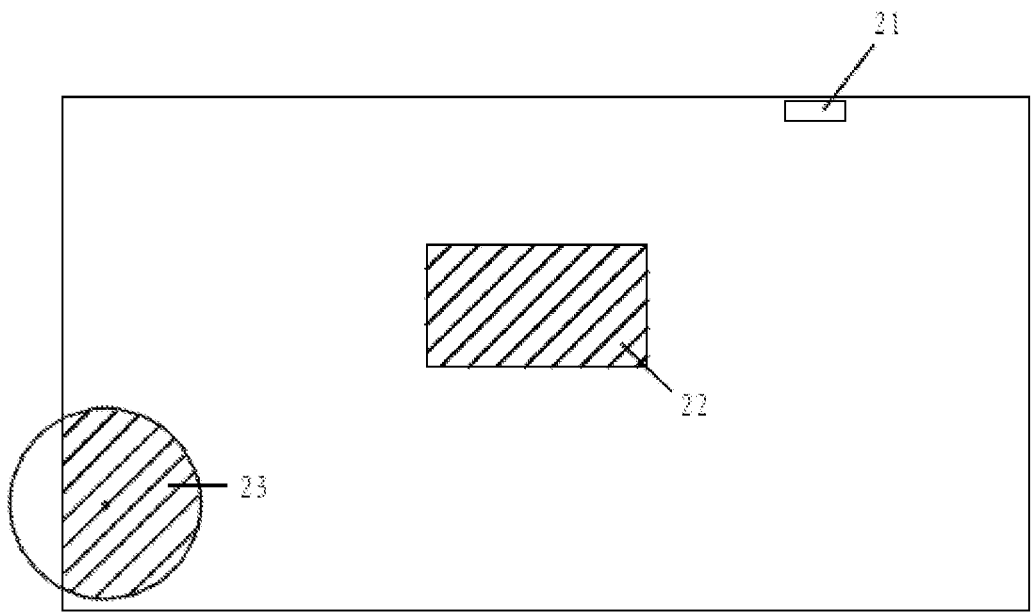
FIG. 6 to FIG. 10 are schematic diagrams of a method for docking an autonomous mobile robot according to some embodiments of the present disclosure.

The power system includes a rechargeable battery, for example, a NiMH battery or a lithium battery. The rechargeable battery may be connected to a charging control circuit, a battery pack temperature detection circuit, and a battery undervoltage monitoring circuit. The charging control circuit, the battery pack temperature detection circuit, and the battery undervoltage monitoring circuit may be connected to a single-chip microcomputer control circuit. The robot is charged by connecting a charging electrode disposed on a side or a lower part of the machine body to the charging station 21 (as shown in FIG. 6).

Figure 3:
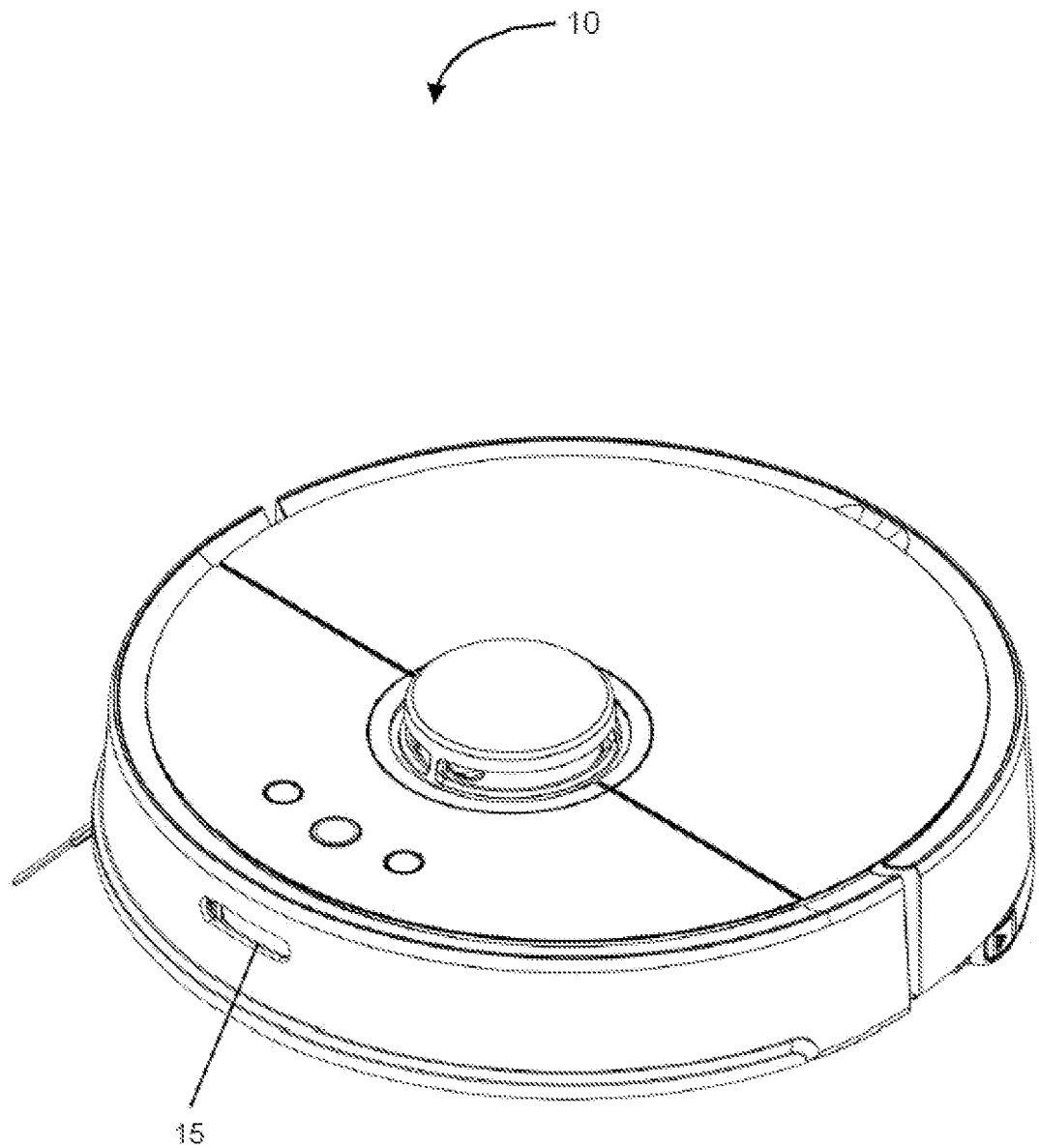
FIG. 3 is another schematic top view of an autonomous mobile robot according to some embodiments of the present disclosure.
Figure 4:
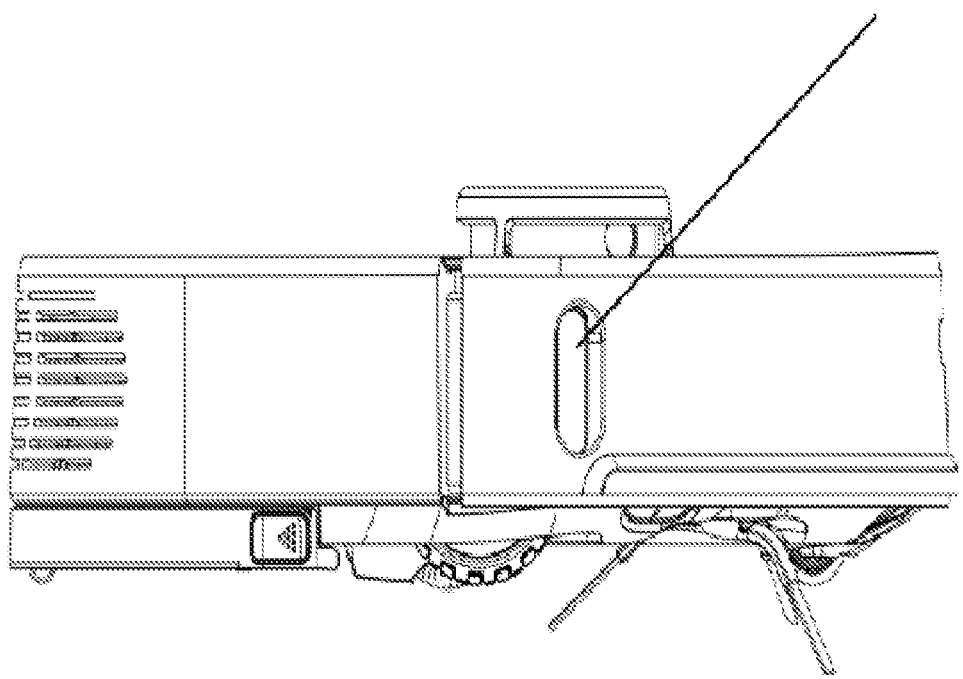
FIG. 4 is a schematic side view of an autonomous mobile robot according to some embodiments of the present disclosure.

As shown in FIG. 3 and FIG. 4, the cleaning robot 10 may be provided with a signal receiver 15 for receiving signals from the charging station 21. In some embodiments, the signal receiver 15 may be disposed on the front of the cleaning robot, or the lateral of the cleaning robot 10. In another embodiment, the signal receiver 15 includes multiple receiving components, while are disposed on the front and lateral of the cleaning robot 10. Normally, when the robot leaves the charging station 21, the system records the position of the charging station 21. Therefore, when the robot completes a task or the cleaning robot is in a low energy level, the driving wheel system is controlled to maneuver the robot to move to the charging station 21 according to the position of the charging station 21 stored in the memory, and then is charged by the charging station.

The human-machine interaction system 9 may include buttons on a panel of the robot, which are used by the user to select functions. The human-machine interaction system 9 may further include a display screen, an indicator, and/or a speaker, which show the current status of the robot or function options for the user. The human-machine interaction system 9 may further include a mobile client application. For a route-navigated cleaning device, the mobile client application can show the user a map of the environment in which the robot is located, as well as the location of the robot, thereby providing the user with more abundant and user-friendly function options.

To describe behavior of the robot more clearly, the following describes definitions of directions. The robot may travel on the surface based on various combinations of movements relative to the following three mutually perpendicular axes defined by the machine body 1: the front-back axis X (that is, the axis along the direction of the front part 13 and the rear part 14 of the machine body 1), the lateral axis Y (that is, the axis perpendicular to the axis X and located on the same horizontal plane as the axis X), and the central vertical axis Z (the axis perpendicular to the plane formed by the axis X and the axis Y). The forward driving direction along the front-back axis X is marked as "forward", and the backward driving direction along the front-back axis X is marked as "backward". The lateral axis Y essentially extends between the right and left wheels of the robot along an axial center defined by the center point of the driving wheel module.

The robot may rotate around the axis Y. When the front part of the robot is tilted upward and the rear part is tilted downward, "pitchup" is defined. When the front part of the robot is tilted downward and the rear part is tilted upward, "pitchdown" is defined. In addition, the robot may rotate around the axis Z. In the forward direction of the robot, when the robot tilts to the right of the axis X, "right turn" is defined; and when the robot tilts to the left of the axis X, "left turn" is defined.

The dust container may be mounted in a receptacle by means of buckle and handle. When the handle is clamped, a clamping part withdraws. When the handle is released, the clamping part protrudes out and is clamped in a recess for holding the clamping part in the receptacle.

With reference to FIG. 5 to FIG. 12, the following describes in detail a method for docking an autonomous mobile robot according to some embodiments of the present disclosure. The autonomous mobile robot may be a cleaning robot, a polishing robot, or a lawn cutting robot. In some embodiments of the present disclosure, the autonomous mobile robot is a cleaning robot 10. In the case that the cleaning robot 10 does not start from the charging station 21, the memory of the robot 10 does not store the position of the charging station 21, there is a long distance between the cleaning robot 10 and the charging station 21, or there is an isolation zone between the cleaning robot 10 and the charging station 21, the method for docking an autonomous mobile robot may be applied.

The method for docking an autonomous mobile robot according to embodiments of the present disclosure is generally to use a scoring mechanism to control the robot to move as far as possible toward a position that is covered by the signal from the charging station 21. However, because the position of the charging station 21 cannot be determined, a mechanism is provided in the embodiments of the present disclosure to enable the robot to move and seek the charging station in an optimized manner. Specifically, the robot is enabled to move toward an open region, because theoretically the signal from the charging station is received more easily in a more open region. Therefore, when the robot moves toward a more open region, the probability that the robot receives the signal from the charging station increases. According to some embodiments of the present application, a region may be classified as a clutter region or a non-clutter region. The non-clutter region indicates that a region is not cluttered with obstacles, and the clutter region indicates that a region is cluttered with obstacles. In some embodiments of the present disclosure, the obstacle may be a wall, or a restriction region.

Figure 5:
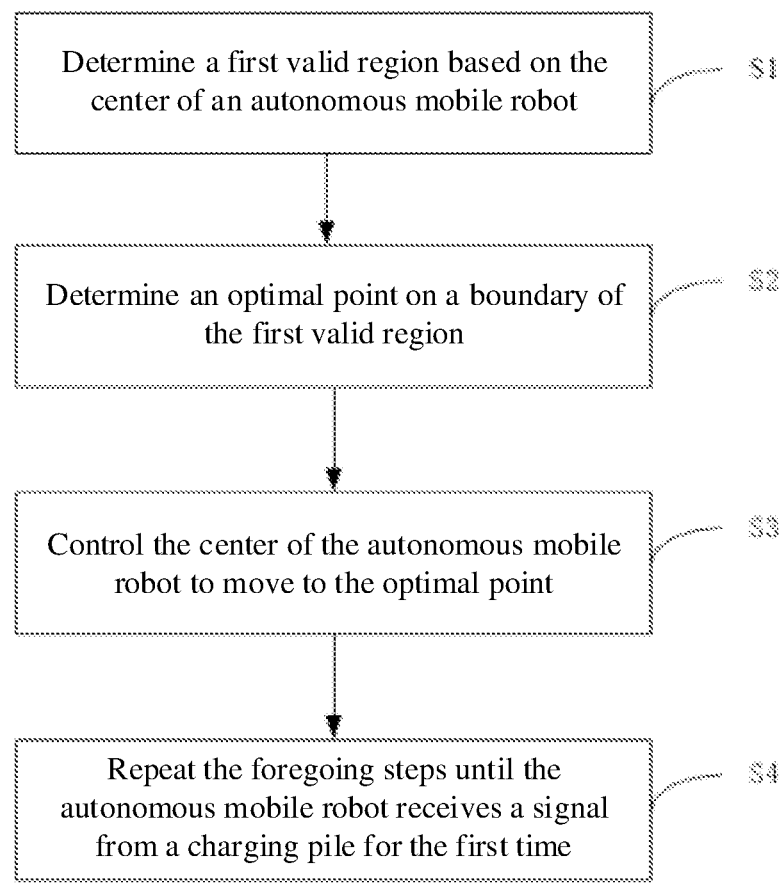
FIG. 5 is a schematic flowchart of a method for docking an autonomous mobile robot according to some embodiments of the present disclosure.

Specifically, as shown in FIG. 5 and FIG. 6, the processor of the robot first controls the execution of program S1: determining a first effective region based on the center of the autonomous mobile robot. Specifically, the robot determines a circular region by using the robot as the center at its starting position, and determines the first effective region 23 in the circular region. A radius of the circular region may be determined based on a model of the robot and an actual area of a house. In some embodiments, the radius of the circular region is set to 1.5 m. The effective region does not include obstacles such as walls, and does not include confined regions. For example, an example of the effective region is a shaded portion in the circular region in FIG. 6.

Figure 7:
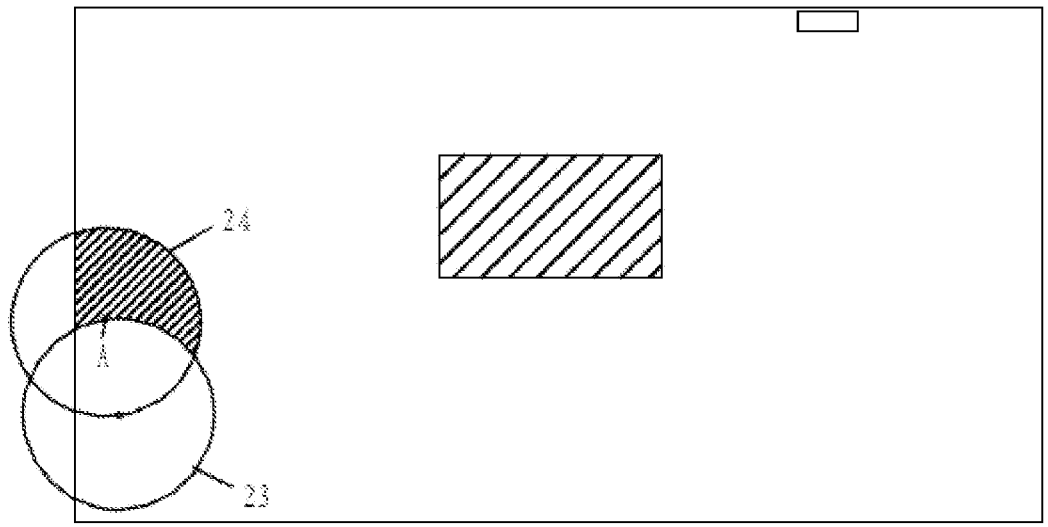
Figure 8:
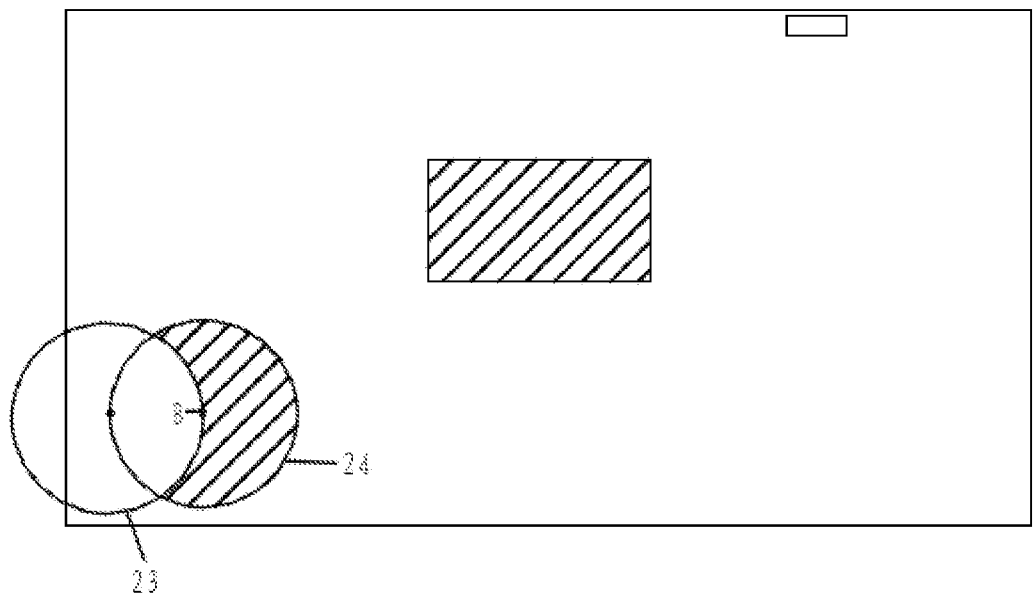

Then, the robot executes program S2: determining an optimal point on a boundary of the first effective region. The optimal point is a point around which there is a largest remaining area. The remaining area is defined as an area of a remaining area that belongs to a second effective region determined by using the optimal point as the center, and that does not overlap the first effective region. FIG. 7 and FIG. 8 are used as examples. In FIG. 7, assuming that A is the optimal point, the circular second effective region 24 is determined by using A as the center, and the remaining area is the area of the second effective region 24 that does not overlap the first effective region 23 (i.e., the shaded portion in the region 24). Similar to FIG. 7, the remaining region in FIG. 8 is an region that belongs to the second effective region 24 determined by using B as the center, and that does not overlap the first effective region 23 (i.e., the shaded portion in the region 24). Clearly, the remaining area in FIG. 8 is larger than the remaining area in FIG. 7. Therefore, the point B in FIG. 8 is determined as the optimal point. In practice, the robot can automatically determine the optimal point by using an operation program of its processor. Preferably, the radius detected by the robot when determining the second effective region 24 is equal to the radius detected by the robot when determining the first effective region 23.

Figure 9:
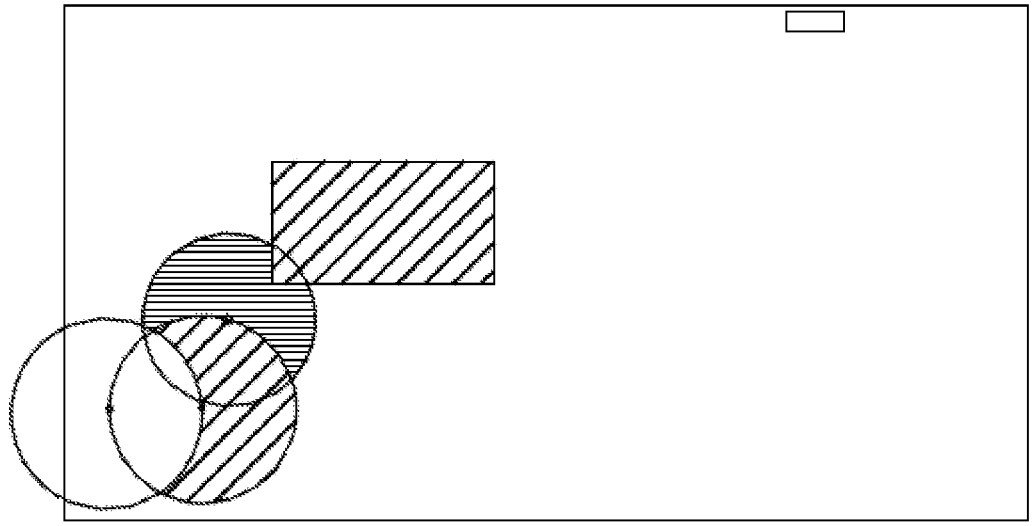
Figure 10:
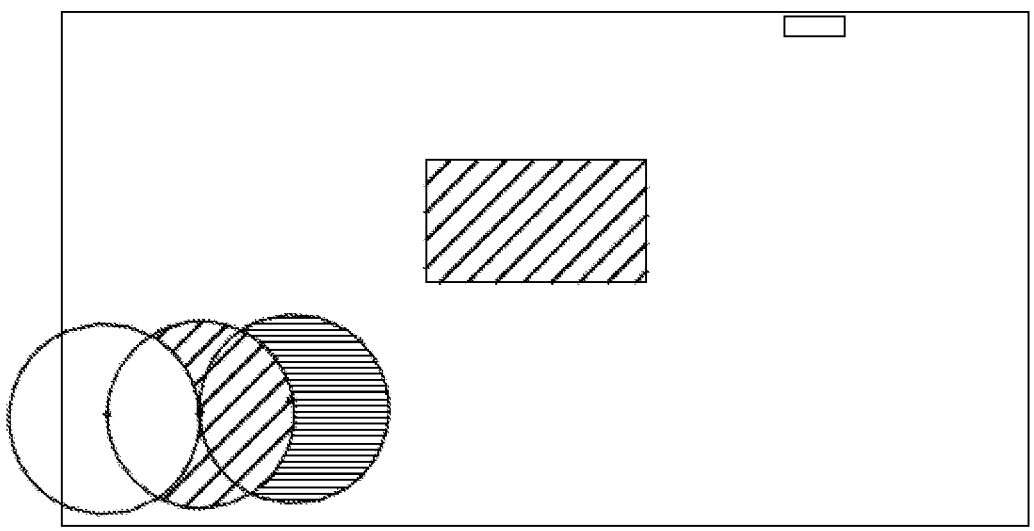

Next, the robot performs step S3: controlling the center of the autonomous mobile robot to move to the optimal point; and step S4: repeating steps S1-S3 when the autonomous mobile robot moves to the optimal point, that is, continuing to determine a effective region based on the center of the autonomous mobile robot, and continuing to determine an optimal point on a boundary of the effective region. As shown in FIG. 9 and FIG. 10, according to the above-mentioned method for determining the optimal point, clearly, the traveling route of the robot in FIG. 10 is a preferred route. In this way, the robot can gradually move toward an open wide region until the robot detects a signal from the charging station for the first time. Then, the steps of the method for docking the robot ends, and the step of the conventional docking the robot is performed.

It should be noted that in each step the robot travels, there may be more than one determined optimal point, but the optimal points have the same weight. In practice, a traversal algorithm of the robot can determine a next point to travel toward. An overall trend is to enable the robot to move toward a wide region, so as to increase the probability of receiving a signal from the charging station.

Figure 12:
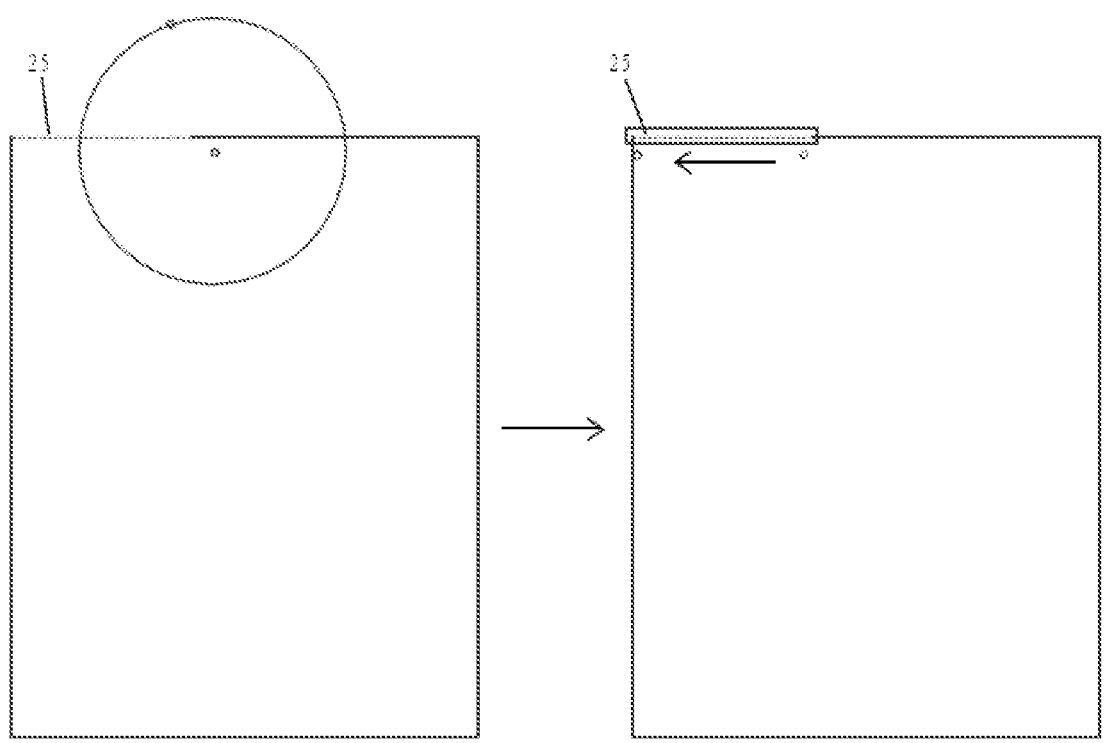
FIG. 12 schematically shows a route of docking an autonomous mobile robot when encountering a confined region according to some embodiments of the present disclosure.

As shown in FIG. 12, when a next optimal point determined by the robot is within a confined region detected by the robot, the robot is controlled to move along a boundary 25 of the confined region (i.e., a virtual wall or a cliff edge) until the robot records the location of the confined region. Specifically, the processor can mark the location of the confined region on the map constructed, and store the location in the memory, so that the robot can be controlled not to return to the confined region again.

The present disclosure further discloses a control device, including a memory, a processor, and a computer program that is stored in the memory and that runs on the processor, where the processor executes the program to perform the foregoing steps. The present disclosure further discloses an autonomous mobile robot that includes the control device, and a smart cleaning system. The smart cleaning system includes a charging station and the foregoing autonomous mobile robot.

According to the method for docking an autonomous mobile robot, the device for controlling an autonomous mobile robot, the autonomous mobile robot, and the smart cleaning system in the present disclosure, the global docking of a robot can be improved. To be specific, when the autonomous mobile robot cannot detect a signal from the charging station, the foregoing program in this application can be executed to enable the robot to automatically detect the signal from the charging station through the method. In this way, the robot does not need to be manually placed near or on the charging station, and manual intervention is further reduced, thereby ensuring the intelligence and reliability of the robot, and improving user experience.

Although example embodiments have been described herein with reference to the accompanying drawings, it should be understood that the example embodiments are merely examples and are not intended to limit the scope of the present disclosure. A person of ordinary skill in the art can make various modifications and variations to the embodiments without departing from the scope and spirit of the present disclosure. All these modifications and variations are intended to be included within the scope of the present disclosure as set forth in the appended claims.

The specification provided herein describes numerous specific details. However, it can be understood that the embodiments of the present disclosure can be implemented without these specific details. In some examples, well-known methods, structures, and technologies are not shown in detail, to avoid obscuring the understanding of this specification.

In addition, a person skilled in the art can appreciate that although some of the embodiments described herein include some features included in other embodiments rather than other features, a combination of features of different embodiments means that these features fall within the scope of the present disclosure and form different embodiments. For example, in the claims, any of the claimed embodiments may be used in any combination.

The foregoing descriptions are merely specific implementations of the present disclosure or descriptions of the specific implementations, but are not intended to limit the protection scope of the present disclosure. Any variation or replacement readily figured out by a person skilled in the art within the technical scope disclosed in the present disclosure shall fall within the protection scope of the present disclosure. The protection scope of the present disclosure shall be subject to the protection scope of the claims.

What is claimed is:

1. A robot, comprising:
   a machine body;
   a driving system, configured to drive the machine body and elements disposed in the machine body to move across a surface;
   a signal receiver, configured to receive a signal from a charging station;
   a control system, disposed in the machine body, and configured to build a simultaneous map of an environment in which the robot is located, and navigate the robot based on the simultaneous map;
   wherein,
   in a process of docking the robot, the signal receiver determines whether the robot is in a coverage region of the signal from the charging station; in response to determining that the robot is not in the coverage region of the signal from the charging station, the control system controls the driving system to drive the robot to move toward an open region based on the simultaneous map; and
   in response to determining that the open region is within a restriction region, the control system controls the driving system to drive the robot to move along a boundary of the restriction region.

2. The robot according to claim 1, wherein in response to determining that the robot enters the coverage region of the signal from the charging station, the control system controls the driving system to drive the robot to approach the charging station based on the signal from the charging station received by the signal receiver.

3. The robot according to claim 1, further comprising a laser distance sensor, configured to measure a distance between the robot and an obstacle around the robot.

4. The robot according to claim 1, further comprising: a restriction region detector.

5. The robot according to claim 4, the restriction region detector comprising a cliff detector or a virtual wall detector.

6. The robot according to claim 4, wherein a virtual wall or a cliff detected by the restriction region detector is marked on the simultaneous map.

7. The robot according to claim 1, further comprising a first cleaning unit comprising a liquid tank and a cleaning cloth.

8. The robot according to claim 7, further comprising a second cleaning unit comprising a rolling brush, a dust container, and a fan.

9. The robot according to claim 1, further comprising a second cleaning unit comprising a rolling brush, a dust container, and a fan.

10. A method for docking a robot with a charging station, comprising:
    building, by a control system of the robot, a simultaneous map of an environment in which the robot is located, and navigating the robot based on the simultaneous map;
    determining, by the control system, whether the robot is in a coverage region of a signal from the charging station;
    controlling, by the control system, the robot to move toward an open region based on the simultaneous map, in response to determining that the robot is not in the coverage region of the signal from the charging station; and
    controlling, in response to determining that the open region is within a restriction region, the robot to move along a boundary of the restriction region.

11. The method according to claim 10, further comprising:
    controlling, by the control system, the robot to approach the charging station based on the signal from the charging station received by the robot, in response to determining that the robot enters the coverage region of the signal from the charging station.

12. The method according to claim 10, wherein the simultaneous map is built at least based on obstacle information obtained by a laser distance sensor of the robot.

13. The method according to claim 12, wherein a restriction region is marked on the simultaneous map.

14. The method according to claim 13, wherein the restriction region comprises a virtual wall or a cliff.

15. A device for controlling a robot, comprising a memory, a processor, and a computer program stored in the memory and that runs on the processor, wherein the processor, when executing the program, is configured to perform operations comprising:
    building a simultaneous map of an environment in which the robot is located, and navigating the robot based on the simultaneous map;
    determining whether the robot is in a coverage region of a signal from a charging station;
    controlling the robot to move toward an open region based on the simultaneous map, in response to determining that the robot is not in the coverage region of the signal from the charging station; and
    controlling, in response to determining that the open region is within a restriction region, the robot to move along a boundary of the restriction region.

16. The device according to claim 15, wherein the operations further comprise:
    controlling the robot to approach the charging station based on the signal from the charging station received by a signal receiver of the robot.

* * * * *